United States Patent
Lannuzel et al.

(10) Patent No.: US 11,279,782 B2
(45) Date of Patent: Mar. 22, 2022

(54) USE OF A VINYLIDENE FLUORIDE COPOLYMER FOR PROVIDING A FILM WITH PROPERTIES OF ADHESION

(71) Applicants: Arkema France, Colombes (FR); Université de Montpellier, Montpellier (FR); Ecole Nationale Supérieure De Chimie De Montpellier, Montpellier (FR); Centre National De La Recherche Scientifique, Paris (FR)

(72) Inventors: Thierry Lannuzel, Villeurbanne (FR); Fabrice Domingues Dos Santos, Paris (FR); Vincent Ladmiral, Montpellier (FR); Thibaut Soulestin, Lyons (FR); Bruno Ameduri, Montpellier (FR)

(73) Assignees: ARKEMA FRANCE, Colombes (FR); UNIVERSITÉ DE MONTPELLIER, Montpellier (FR); ECOLE NATIONALE SUPERIEURE DE CHIMIE DE MONTPELLIER, Montpellier (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 711 days.

(21) Appl. No.: 16/072,225

(22) PCT Filed: Jan. 17, 2017

(86) PCT No.: PCT/FR2017/050101
§ 371 (c)(1),
(2) Date: Jul. 24, 2018

(87) PCT Pub. No.: WO2017/129881
PCT Pub. Date: Aug. 3, 2017

(65) Prior Publication Data
US 2019/0062476 A1 Feb. 28, 2019

(30) Foreign Application Priority Data

Jan. 25, 2016 (FR) .................................... 1650548

(51) Int. Cl.
*C08F 214/22* (2006.01)
*C09D 127/16* (2006.01)
(Continued)

(52) U.S. Cl.
CPC ............ *C08F 214/225* (2013.01); *B32B 7/04* (2013.01); *B32B 15/08* (2013.01); *B32B 15/082* (2013.01);
(Continued)

(58) Field of Classification Search
None
See application file for complete search history.

(56) References Cited

U.S. PATENT DOCUMENTS

| 3,445,434 A | 5/1969 | Stilmar |
| 2016/0046746 A1 | 2/2016 | Ameduri et al. |
| 2017/0261133 A1* | 9/2017 | Nakamura ............. C08G 69/02 |

FOREIGN PATENT DOCUMENTS

| JP | 2003-040936 | 2/2003 | |
| WO | WO 2014/162080 | 10/2014 | |
| WO | WO-2015128337 A1 * | 9/2015 | ............. C08J 3/247 |

\* cited by examiner

*Primary Examiner* — Ramsey Zacharia
(74) *Attorney, Agent, or Firm* — Saliwanchik, Lloyd & Eisenschenk

(57) ABSTRACT

The present invention relates to the use of a fluorinated copolymer in the manufacture of a solid polymer film, to give said film properties of adhesion to a metal surface or to glass. It also relates to a process for improving the adhesion of a fluoropolymer to a metal, polymer or glassy substrate, and also to a composite part comprising a solid polymer film in direct contact with at least one metal or glassy element.

3 Claims, 6 Drawing Sheets

(51) Int. Cl.

| | | |
|---|---|---|
| *C08L 43/02* | (2006.01) |
| *B32B 27/24* | (2006.01) |
| *B32B 27/32* | (2006.01) |
| *B32B 15/20* | (2006.01) |
| *B32B 15/08* | (2006.01) |
| *B32B 27/30* | (2006.01) |
| *B32B 15/082* | (2006.01) |
| *B32B 27/22* | (2006.01) |
| *B32B 7/04* | (2019.01) |
| *B32B 15/085* | (2006.01) |
| *B32B 27/18* | (2006.01) |
| *B32B 27/06* | (2006.01) |
| *B32B 17/10* | (2006.01) |
| *B32B 15/18* | (2006.01) |
| *B32B 27/20* | (2006.01) |
| *B32B 27/28* | (2006.01) |

(52) U.S. Cl.
CPC ............ *B32B 15/085* (2013.01); *B32B 15/18* (2013.01); *B32B 15/20* (2013.01); *B32B 17/1055* (2013.01); *B32B 27/06* (2013.01); *B32B 27/18* (2013.01); *B32B 27/20* (2013.01); *B32B 27/22* (2013.01); *B32B 27/24* (2013.01); *B32B 27/285* (2013.01); *B32B 27/304* (2013.01); *B32B 27/322* (2013.01); *C08F 214/22* (2013.01); *C08L 43/02* (2013.01); *C09D 127/16* (2013.01); *B32B 2250/02* (2013.01); *B32B 2264/107* (2013.01); *B32B 2264/108* (2013.01); *B32B 2270/00* (2013.01); *B32B 2307/50* (2013.01); *B32B 2307/728* (2013.01); *B32B 2457/00* (2013.01); *B32B 2457/10* (2013.01); *B32B 2457/16* (2013.01); *B32B 2457/18* (2013.01)

USE OF A VINYLIDENE FLUORIDE COPOLYMER FOR PROVIDING A FILM WITH PROPERTIES OF ADHESION

CROSS-REFERENCE TO RELATED APPLICATION

This application is the U.S. national stage application of International Patent Application No. PCT/FR2017/050101, filed Jan. 17, 2017.

FIELD OF THE INVENTION

The present invention relates to the use of a fluorinated copolymerfluorinated copolymer in the manufacture of a solid polymer film, to give said film properties of adhesion to a metal or polymer surface or to glass. It also relates to a process for improving the adhesion of a fluoropolymer to a metal, polymer or glassy substrate, and also to a composite part comprising a solid polymer film in direct contact with at least one metal or glassy element.

TECHNICAL BACKGROUND

Metallized polymer films have many applications, in particular in the manufacture of electrically conductive devices. Among the polymers that can be used, fluoropolymers based in particular on vinylidene fluoride (VDF) represent a class of compounds that have remarkable properties for a large number of applications. PVDF and copolymers comprising VDF and trifluoroethylene (TrFE) are particularly advantageous due to their piezoelectric properties. They can thus be used for the manufacture of various pieces of electroactive equipment, such as actuators or sensors, in general comprising a film of the polymer sandwiched between two electrodes.

Conversely, it is known to apply a polymer film to a metal substrate, in particular for the purpose of giving it corrosion resistance. It has also been suggested to use VDF-based polymers for this purpose, in so far as they have good barrier properties and good resistance to climatic conditions.

It is understood that, in these various applications, one condition essential to obtaining the desired result is the good adhesion of the polymer to the metal.

This property is particularly important for the manufacture of electroactive devices. Specifically, the good adhesion of the polymer to a metal electrode makes it possible to simplify the process for manufacturing these devices by rendering the preliminary step of treating the electrode (in particular using chromium), so as to promote the adhesion of the electroactive polymer, unnecessary. It also enables the manufacture of multilayer devices without the risk of delamination or loss of electrical conductivity.

However, it has been observed that VDF homopolymers and copolymers, in particular copolymers of VDF and of trifluoroethylene (TrFE), exhibited, due to the hydrophobic nature thereof, insufficient adhesion to metals.

To solve this problem, it has been proposed to mix PVDF with copolymers that improve its compatibility with metals, in particular methyl methacrylate copolymerized with monomers bearing phosphonic acid functions (C. Bressy-Brondino et al., *J Appl. Polym. Sci.*, 2002, 8, 2277-2287). However, these additives modify the properties of the PVDF and in particular its dielectric activity. As a variant, it has been suggested to insert a layer of these copolymers between the metal substrate and the PVDF film (US 2010/0057189). This approach is not suitable either for the formation of electroactive devices, in which the electroactive fluoropolymers must be in direct contact with the metal surface in order to limit dielectric losses.

Another solution consisted in grafting acid monomers to PVDF previously oxidized by ozonation (Brondino et al., *J Appl. Polym. Sci.*, 1999, 72, 611-620). This technique is however liable to result in a degradation of the polymer chains during the ozonation step. Similarly, it has been proposed to copolymerize vinylidene fluoride with perfluorovinyl ethers (Yamabe et al., *Euro. Polym. J.*, 2000, 36, 1035-1041) or with vinyl esters such as vinyl acetate (WO 2014/149911) or else with an epoxy monomer of glycidyl ether type combined with a maleic acid monoester used as crosslinking agent (EP 0 751 157). Although this approach makes it possible to improve the adhesion of the polymer, it has the drawback of modifying its properties and in particular its electroactivity properties.

Copolymers of VDF with monomers bearing phosphonic acid functions such as vinylphosphonic acid (WO 2012/030784; US2012/0184653; WO 2014/162080) are furthermore known. It is not suggested that the copolymers described in these documents have a remarkable adhesion to metals and/or to glass. Moreover, the vinylphosphonic comonomer represents at least 1 mol %, and preferably 2 to 18 mol %, of the copolymer of WO 2014/162080. It is also known that vinylphosphonic acid makes it possible to improve the adhesion of certain copolymers based on ethylene and on tetrafluoroethylene (U.S. Pat. No. 3,445,434) to a metal substrate. However, these copolymers have a very compact crystalline structure that does not allow them to be shaped at ambient temperature. They must therefore be applied in the molten state to the substrate.

Another adhesion-promoting monomer which has been copolymerized with VDF is trifluoromethacrylic acid (JP2003-040936). It is not however suggested that it can improve the adhesion of copolymers based on VDF and on TrFE to metal substrates or to glass, a fortiori when it is introduced into these copolymers in a small amount, less than or equal to 1 mol %.

SUMMARY OF THE INVENTION

There remains the need to provide a simple, economically advantageous and efficient means for imparting a good adhesion of polymers based on VDF and on TrFE to polar hydrophilic surfaces such as metal surfaces and glass and to polymers, without significantly modifying the properties of these polymers and in particular their thermal properties and their electroactivity.

It has turned out that this need could be met by copolymerizing VDF and TrFE with a small amount of an adhesion-promoting monomer which consists of a non-perfluorinated vinyl or vinylene monomer bearing at least one weak acid or weak acid precursor function. It is thus possible to envisage the use of these copolymers in the manufacture of polymer films intended to be joined to metal parts with a view to obtaining various composite parts.

The invention thus relates to the use of a fluorinated copolymerfluorinated copolymer in the manufacture of a solid polymer film, in order to give said film properties of adhesion to a metal surface or to glass, characterized in that said copolymer is obtained by:
(a) radical copolymerization of monomers comprising, and preferably consisting of:
(i) vinylidene fluoride (VDF), (ii) trifluoroethylene (TrFE), (iii) optionally at least one other fluoromonomer and (iv) an adhesion-promoting monomer which is a non-perfluorinated vinyl or vinylene monomer bearing at least one weak acid or weak acid precursor function, with the exception of carboxyvinyl, carboxyvinylene, 1-alkylcarboxyvinyl and 1-alkylcarboxyvinylene monomers and precursors thereof, and
(b) when they are present, conversion of the weak acid precursor functions into weak acid functions.

Another subject of the invention is a process for improving the adhesion, to a metal, polymer or glassy substrate, of a fluoropolymer obtained from monomers comprising, or preferably consisting of, vinylidene fluoride (VDF), trifluoroethylene (TrFE) and optionally at least one other fluoromonomer, characterized in that it consists in introducing into said fluoropolymer units resulting from the radical copolymerization of a non-perfluorinated vinyl or vinylene monomer bearing at least one weak acid or weak acid precursor function, with the exception of carboxyvinyl, carboxyvinylene, 1-alkylcarboxyvinyl and 1-alkylcarboxyvinylene monomers and precursors thereof, and from the conversion of the weak acid precursor function into a weak acid, when it is present.

Yet another subject of the invention is a composite part comprising a solid polymer film in direct contact with at least one metal, polymer or glassy element, characterized in that said film is manufactured from a copolymer obtained by:
(a) radical copolymerization of monomers comprising, and preferably consisting of:
  (i) vinylidene fluoride (VDF), (ii) trifluoroethylene (TrFE), (iii) optionally at least one other fluoromonomer and (iv) an adhesion-promoting monomer which is a non-perfluorinated vinyl or vinylene monomer bearing at least one weak acid or weak acid precursor function, with the exception of carboxyvinyl, carboxyvinylene, 1-alkylcarboxyvinyl and 1-alkylcarboxyvinylene monomers and precursors thereof, so that the molar proportion of the moieties derived from said adhesion-promoting monomer represents less than 1% of the copolymer, and
(b) when they are present, conversion of the weak acid precursor functions into weak acid functions.

It was observed that the introduction of the aforementioned adhesion-promoting monomer into fluoropolymers based on VDF and on TrFE, in an amount as low as 1 mol % or even less, made it possible to considerably increase the adhesion of these polymers to metal surfaces without substantially modifying their thermal stability, especially their 5% weight loss decomposition temperature, determined by thermogravimetric analysis, their dielectric properties and in particular their Curie temperature, measured by differential scanning calorimetry, and also their semicrystalline nature, determined by their melting temperature and their enthalpy of fusion. In addition, these copolymers have a polarization curve similar to that of polymers with no adhesion-promoting monomer, namely the same remanent polarization, the same coercive field and the same hysteresis. The result of this is that the range of uses of these fluoropolymers, modified according to the invention by the introduction of an adhesion-promoting monomer, is not limited by the introduction of this monomer.

DESCRIPTION OF EMBODIMENTS OF THE INVENTION

Figure 1:
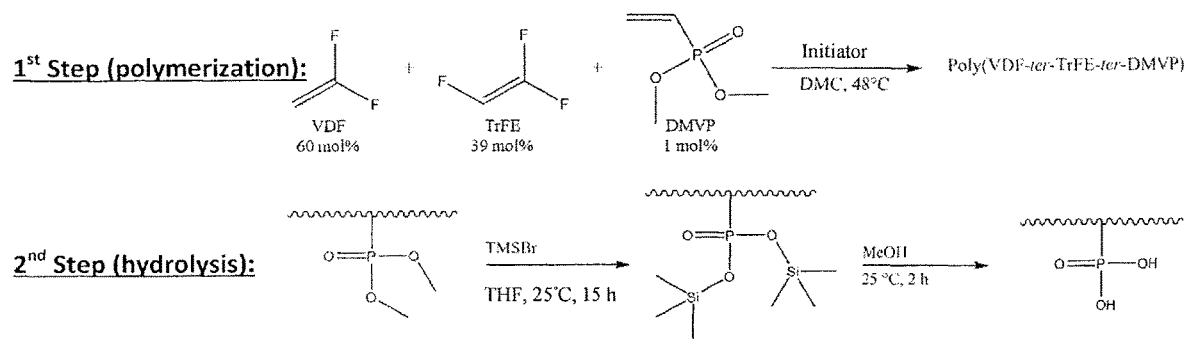
FIG. 1 illustrates the radical terpolymerization of VDF with TrFE and DMVP and the hydrolysis of the terpolymer obtained.

The invention will now be described in greater detail and non-limitingly in the description which follows.

One subject of the invention is the use of a fluorinated copolymer in the manufacture of a solid polymer film, to give said film properties of adhesion to a metal or polymer surface or to glass.

The fluorinated copolymer used in this invention comprises a moiety derived from vinylidene fluoride (VDF) and a moiety derived from trifluoroethylene (TrFE). In addition, it optionally contains at least one other moiety derived from a fluoromonomer, which may in particular be chosen from: tetrafluoroethylene (TFE), chlorofluoroethylene (CFE), chlorotrifluorethylene (CTFE), hexafluoropropylene (HFP), trifluoropropene, tetrafluoropropene, chlorotrifluoropropene, hexafluoroisobutylene, perfluorobutylethylene, pentafluoropropene, perfluoroethers such as perfluoromethylvinyl ether (PMVE) and perfluoropropylvinyl ether (PPVE), and mixtures thereof. It is clearly understood that all the geometric isomers of the aforementioned fluorinated compounds are included in the above terminologies, such as 3,3,3-trifluoropropene, 2,3,3,3-tetrafluoropropene (or 1234yf), 3-chloro-2,3,3-trifluoropropene (or 1233yf) and 3-chloro-3,3,3-trifluoropropene. Preferably, when it is present, said other fluoromonomer is chosen from CFE and CTFE. Moreover, it is preferred that the copolymer according to the invention does not contain a moiety derived from a non-fluorinated monomer, apart from optionally the adhesion-promoting monomer described below.

This fluorinated homopolymer or copolymer on its own does not have good adhesion properties to polar hydrophilic surfaces such as metal surfaces or glass. In order to give this polymer the desired adhesion properties, moieties derived from an adhesion-promoting monomer are introduced into this polymer. In order to do this, the aforementioned monomers are copolymerized, by radical copolymerization, with an adhesion-promoting monomer which is a non-perfluorinated vinyl or vinylene monomer bearing at least one weak acid or weak acid precursor function. In the case where the adhesion-promoting monomer bears a weak acid precursor function, the copolymerization step is followed by a step of converting the weak acid precursor functions into weak acid functions.

The weak acid function of the adhesion-promoting monomer is advantageously chosen from a carboxylic acid function and a phosphonic acid function. When this monomer bears several (generally two or three) weak acid functions, these may be identical or different. In one preferred embodiment of the invention, the adhesion-promoting monomer bears a single weak acid function.

It should be noted that this monomer is different from a carboxyvinyl, carboxyvinylene, 1-alkylcarboxyvinyl or 1-alkylcarboxyvinylene monomer and precursors thereof. Thus, acrylic acid, methacrylic acid and esters thereof are not included among the adhesion-promoting monomers that can be used in the present invention. In the case where the adhesion-promoting monomer bears a carboxylic acid function, it is preferred for this carboxylic acid function to be borne on a vinylene monomer bearing an electron-withdrawing group such as a trifluoromethyl group.

According to one particular embodiment of the invention, the adhesion-promoting monomer bears at least one function that is a precursor of a weak acid, in particular a precursor of carboxylic acid or, better still, a precursor of phosphonic acid. Such precursors are in particular carboxylic acid salts and alkyl esters and phosphonic acid salts and alkyl esters. In the present invention, it is preferred to use phosphonic acid alkyl esters. Examples of such functions are the phosphonic acid monoalkyl ester and dialkyl ester functions and preferably phosphonic acid dialkyl ester functions, such as phosphonic acid methyl, ethyl or isopropyl esters, more particularly phosphonic acid methyl esters. A vinyl monomer bearing such functions is in particular vinylphosphonic acid dimethyl ester (DMVP).

It is clearly understood that the adhesion-promoting monomer may bear both a weak acid function and a weak acid precursor function, chosen from those described above.

The preferred adhesion-promoting monomers according to this invention are chosen from a vinylphosphonic acid dialkyl ester, in particular vinylphosphonic acid dimethyl ester, vinylphosphonic acid and (2-trifluoromethyl)acrylic acid.

The molar mass of the adhesion-promoting monomer is for example between 100 and 250 g/mol, preferably between 100 and 200 g/mol.

The adhesion-promoting monomer may be introduced into the fluoropolymer in any molar amount, provided that it does not substantially affect the thermal, mechanical or electrical properties of the copolymer. For obvious economic reasons, the molar percentage of the moiety derived from this monomer within the copolymer will not however generally exceed an amount sufficient to obtain the desired adhesion properties. Thus, it is preferred according to this invention that the molar proportion of the moieties derived from the adhesion-promoting monomer represents less than 1% of the copolymer, preferably from 0.2% to 0.9%, for example from 0.5% to 0.8% of the copolymer.

In the case where the adhesion-promoting monomer is 2-trifluoromethacrylic acid (MAF), the molar proportion of moieties derived from this monomer may be calculated using the following equation:

$$\% \ MAF = nMAF / (nVDF + nTrFE + nX) \ \text{where:}$$

$$n_{MAF} = \frac{1}{3} \int_{-59}^{-72} CF_3$$

$$n_{TrFE} = \int_{-194}^{-221} CFH$$

$$n_{VDF} = \frac{1}{2} \int_{-90}^{-132} CF_2 - n_{TrFE}$$

where $\int_i^j CF_x$ denotes the integral of the signal attributed to CFx, ranging from i to j ppm, in $^{19}$F NMR spectroscopy. The molar proportion of moieties derived from other adhesion-promoting monomers may be calculated in a similar manner. In the case of adhesion-promoting monomers containing no fluorine atoms, the molar proportion of the moieties derived from this monomer is calculated by combining the results of $^1$H and $^{19}$F NMR analyses.

According to one embodiment, the copolymer according to the invention has the following composition (in moles):
a proportion of moieties derived from vinylidene fluoride of from 40% to 95%, preferably from 50% to 85%;
a proportion of moieties derived from an additional fluoromonomer of from 0% to 15%,
a proportion of moieties derived from trifluoroethylene of from 5% to 60%, preferably from 15% to 50%; and
a proportion of moieties derived from the adhesion-promoting monomer of from 0.1% to 5%, preferably from 0.5% to 2% and more preferentially from 0.5% to 0.8%,
the above molar proportions being relative to the sum of the moles of the moieties constituting the copolymer.

The copolymers used according to the invention are advantageously random and linear.

The copolymerization reaction is generally carried out in the presence of a radical initiator. This may for example be a t-alkyl peroxyester such as tert-butyl peroxypivalate (or TBPPI), tert-amylperoxypivalate, a peroxydicarbonate such as bis(4-tert-butyl cyclohexyl) peroxydicarbonate, sodium, ammonium or potassium persulfates, benzoyl peroxide and derivatives thereof, a t-alkyl hydroperoxide such as tert-butyl hydroxyperoxide, a t-alkyl peroxide such as tert-butyl peroxide or a t-alkylperoxyalkane such as 2,5-bis(tert-butylperoxy)-2,5-dimethylhexane. As a variant or in addition, use may be made, as radical initiator, of an azo initiator or a redox system.

According to one embodiment, the copolymerization may be carried out in the presence of a dispersant. This may for example be a water-soluble cellulose derivative, such as alkyl celluloses or alkyl hydroxyalkyl celluloses, a paraffin, polyvinyl alcohols and mixtures thereof.

According to one embodiment, the copolymerization may be carried out in the presence of a chain transfer agent that makes it possible to control the molar mass of the copolymer, in particular with a view to facilitating the processing thereof. Molar mass control agents may for example be alkyl acetates such as ethyl acetate, bisalkyl carbonates such as diethyl carbonate, ketones such as butan-2-one, thiols, alkyl halides, saturated alcohols such as isopropanol and alkanes such as propane.

Finally, the reaction medium may comprise one or more pH adjusters.

According to a first embodiment, the copolymer used according to the invention is prepared by a radical solution polymerization process, comprising a step of copolymerization of a reaction mixture of fluoromonomers and adhesion-promoting monomer in the presence of a radical initiator in a solvent.

According to one particular embodiment:
the molar proportion of VDF in the reaction mixture is from 40% to 95%, preferably from 50% to 85%;
the molar proportion of TrFE in the reaction mixture is from 5% to 60%, preferably from 15% to 50%;
the molar proportion of additional fluoromonomer in the reaction mixture is from 0% to 15%, and
the molar proportion of adhesion-promoting monomer in the reaction mixture is from 0.1% to 5%, preferably from 0.5% to 2% and more preferentially from 0.5% to 0.8%,
the molar proportions being relative to the sum of the moles of the monomers.

According to one embodiment, the reaction mixture essentially consists of, and preferably consists of, a mixture of vinylidene fluoride and trifluoroethylene with the adhesion-promoting monomer and optionally at least one other fluoromonomer, radical initiator, and solvent. The expression "essentially consists of" is understood to mean that it contains at least 70 mol %, more preferentially at least 80 mol %, for example at least 90 mol %, or even at least 95 mol %, of these constituents.

The reaction is carried out in a solvent, which is for example chosen from a halogenated organic solvent such as 1,1,1,3,3-pentafluorobutane, 2,2,2-trifluoroethanol, hexafluoroisopropanol; acetonitrile; a ketone such as methyl ethyl ketone or cyclohexanone; a carbonate such as dimethyl carbonate; an ester such as methyl acetate, ethyl acetate; water and mixtures thereof.

According to one embodiment, the reaction mixture is heated to a reaction starting temperature between 20° C. and 100° C. and preferably between 25° C. and 80° C. The initial pressure inside the autoclave varies as a function of the solvent, the temperature of the reaction and the amount of monomers. It is generally between 0 and 80 bar, for example between 20 and 40 bar. The choice of the optimal temperature depends on the initiator that is used. Generally, the reaction is carried out over a period equal to two to four times the half life of the initiator used, for example from 6 hours to 25 h, at a temperature at which the half life of the initiator is between 1 and 10 hours.

The molar mass of the copolymer obtained by solution polymerization is preferably from 5000 to 200 000 g/mol, more preferentially from 10 000 to 150 000 g/mol.

According to another embodiment, said terpolymer is prepared by a radical suspension polymerization process, comprising a step of copolymerization of a reaction mixture of the monomers in the presence of water, a radical initiator, optionally a dispersant and, optionally, a chain transfer agent.

The suspension process makes it possible to avoid the use of toxic solvents and of fluorinated surfactants (of PFOA or PFOS type which are bioaccumulative, toxic and persistent) during the synthesis and purification of the copolymer.

In the suspension process, the monomers are loaded into a stirred reactor containing deionized water, optionally a dispersant and, optionally, a chain transfer agent.

The reactor is then brought to the desired initiation temperature, this temperature being maintained during the polymerization at a value between 40° C. and 60° C. The initiator is then injected into the reactor in order to start the polymerization. The pressure is generally maintained within the range from 80 to 110 bar by injecting deionized water or a mixture of monomers. The consumption of the monomers leads to a drop in pressure which is compensated for by a continuous supply of water. The pressure is thus maintained within a range extending from 80 to 110 bar. The reactor is then cooled and degassed. The product is discharged and recovered in the form of a suspension. This suspension is filtered and the wet powder is washed and then dried.

The suspension polymerization process is simplified since it makes it possible to continuously inject only water in order to maintain the pressure in the reactor.

According to yet another embodiment, the terpolymer used according to the invention is prepared according to a radical emulsion polymerization process.

In order to do this, an aqueous dispersion of the initiator stabilized by the surfactant used to carry out the polymerization is advantageously prepared. It is preferred not to use a perfluorinated surfactant. To produce this dispersion, water, initiator and a small fraction of the total amount of surfactant are mixed in a disperser. It is this dispersion that is added at the start of, then optionally during, the polymerization. After loading the polymerization reactor with water, surfactant and optionally paraffin, the reactor is pressurized, after having removed the oxygen, by adding thereto vinylidene fluoride alone or as a mixture with the comonomers and is brought to the chosen temperature. Advantageously, the aqueous emulsion is polymerized at a temperature of from 50° C. to 130° C. Preferably, the polymerization is carried out at an absolute pressure of from 40 to 120 bar. The reaction is started by adding the dispersion of initiator. During the polymerization, VDF alone or as a mixture with the comonomers is optionally added in order to maintain the pressure or in order to obtain a controlled pressure variation. The initiator is optionally added in increments or continuously. A chain transfer agent (CTA) may optionally be added at the start of or during the polymerization. In the latter case, it may be introduced in increments or continuously. After introducing the anticipated amount of mixture of monomers, the reactor is degassed and cooled and the latex is drained off.

The recovery of the polymer from the latex forms the finishing operation. This essentially consists in coagulating the latex then in drying the coagulate in order to obtain a dry powder. The finishing operation may also include a washing step. This washing step may, for example, be carried out by introducing the latex, optionally diluted, into a coagulator where it is subjected to shearing in the presence of air. Under the combined effect of these two actions, the latex is converted into an aerated cream having a density lower than that of water. This cream is optionally washed countercurrently with deionized water, for example according to the process described in patents U.S. Pat. No. 4,128,517 and EP 0 460 284. The drying may be carried out according to any industrial means known to a person skilled in the art. In particular, the coagulated latex or the cream can advantageously be dried in a spray dryer. Thus, at the outlet of the washing column or immediately after the coagulation, the aerated cream is sent to a storage container before being pumped into a spray dryer which converts it into a dry powder. This step of drying in a spray dryer may also be applied to the initial, optionally diluted, latex, to the latex coagulated for example by mechanical shearing with or without prior dilution or else to the aerated cream.

Another emulsion polymerization process that can be used to prepare the copolymer used according to the invention is the one described in document U.S. Pat. No. 7,122,608.

At the end of the copolymerization reaction, the copolymers obtained must be hydrolysed in the case where the adhesion-promoting monomer used contains a weak acid precursor function, in order to convert this into a weak acid function. This hydrolysis reaction may be carried out using conventional reactants and hydrolysis (dealkylation) conditions, especially using strong acids or bases, such as hydrochloric acid, used hot (for example at 80-100° C.) or, in the case especially of phosphonic acid alkyl esters, by treatment with sodium bromide followed by an acidification step or more preferentially by reaction with a halogenated silane, such as bromotrimethylsilane, in an organic solvent such as THF, at a temperature of from 20° C. to 40° C., for example, followed by a hydrolysis step using methanol.

The copolymer used according to the invention has sufficient mechanical properties to enable it to be able to be formed into a film. This film forming may be carried out for example: by extrusion; by casting of a solution of copolymer in an organic solvent; by spin coating of a solution of copolymer in an organic solvent; or by printing of a solution of copolymers in an organic solvent. The films thus obtained, after a drying step followed by a postcuring step, have good mechanical properties and can be stretched.

Before this film-forming step, it is possible to add various additives to the copolymer, such as reinforcing fillers, conductive fillers such as carbon nanotubes, conductive salts, piezoelectric particles such as $BaTiO_3$ nanoparticles, plasticizers, crosslinking agents, crosslinking initiators, triethoxysilanes and mixtures thereof. The copolymer may also be mixed with another polymer such as PVDF.

The copolymers used according to the invention further preferably satisfy at least one criterion which qualifies them as electroactive polymers, in particular they have a Curie temperature below 110° C., preferably below 100° C., and a maximum dielectric constant of greater than 30.

Their melting temperature is generally between 110° C. and 160° C., more particularly between 115° C. and 155° C.

Due to their good adhesiveness to polar hydrophilic surfaces such as glass and more particularly metal surfaces, these copolymers may be used as coatings for these surfaces or on the other hand as substrates for metal coatings. The expression "metal surfaces" is understood to mean surfaces consisting of or coated with metals, metal oxides or metal alloys. The metals considered may be chosen from steel, copper, gold, silver, nickel or aluminium, without this list being limiting. As a variant, the copolymers according to the invention may be used as coatings for polymer substrates and especially mixtures of ionomers such as the PEDOT: PSS mixture where PEDOT denotes poly(3,4-ethylenedioxythiophene) and PSS denotes poly(styrene sulfonate).

These films are useful for the manufacture of composite parts comprising a solid polymer film of the copolymer in direct contact with at least one metal, polymer or glassy element. This composite part may form an electroactive device, such as an actuator, a sensor or an artificial muscle; a membrane; a capacitor; a binder for lithium-ion batteries; or a component of a device for producing energy such as a fuel cell.

EXAMPLES

The following examples illustrate the invention without limiting it.

Measurement Techniques and Apparatus

Nuclear Magnetic Resonance (NMR). The NMR spectra are recorded on a Bruker AC 400 machine, deuterated acetone is used as solvent. The coupling constants and the chemical shifts are respectively given in hertz (Hz) and in parts per million (ppm). The acquisition parameters for the $^1H$ [or $^{19}F$] NMR are the following: angle of rotation 90° [30°], acquisition time 4.5 s [0.7 s], pulse sequence 2 s, number of scans 8 [128] and a pulse duration of 5 µs for $^{19}F$ NMR.

Thermogravimetric Analyses (TGA). The TGA analyses are carried out on 10-15 mg samples on a Q 50 TGA machine from TA Instruments in aluminium pans. The temperature rise is performed at 10° C./min, in air between 25° C. and 590° C.

Differential scanning calorimetry (DSC). The DSC measurements are obtained on 10-15 mg samples on a Netzsch DSC 200 F3 machine using the following analysis cycle: cooling from ambient temperature to −50° C. at 20° C./min, isotherm at −50° C. for 5 min, first rise from −50° C. to 200° C. at 10° C./min, cooling from 200° C. to −50° C. at 10° C./min, isotherm at −50° C. for 3 min, second temperature rise from −50° C. to 200° C. at 10° C./min and last cooling from 200° C. to ambient temperature. The calibration was carried out with noble metals and verified with a sample of indium before the analysis. The Curie transition temperature and melting temperature are determined at the maximum of the endothermic peaks.

Example 1

Radical Terpolymerization of VDF with TrFE and DMVP

A poly(VDF-ter-TrFE-ter-DMVP) terpolymer was prepared according to the reaction scheme illustrated in FIG. 1 ($1^{st}$ step).

Figure 3:
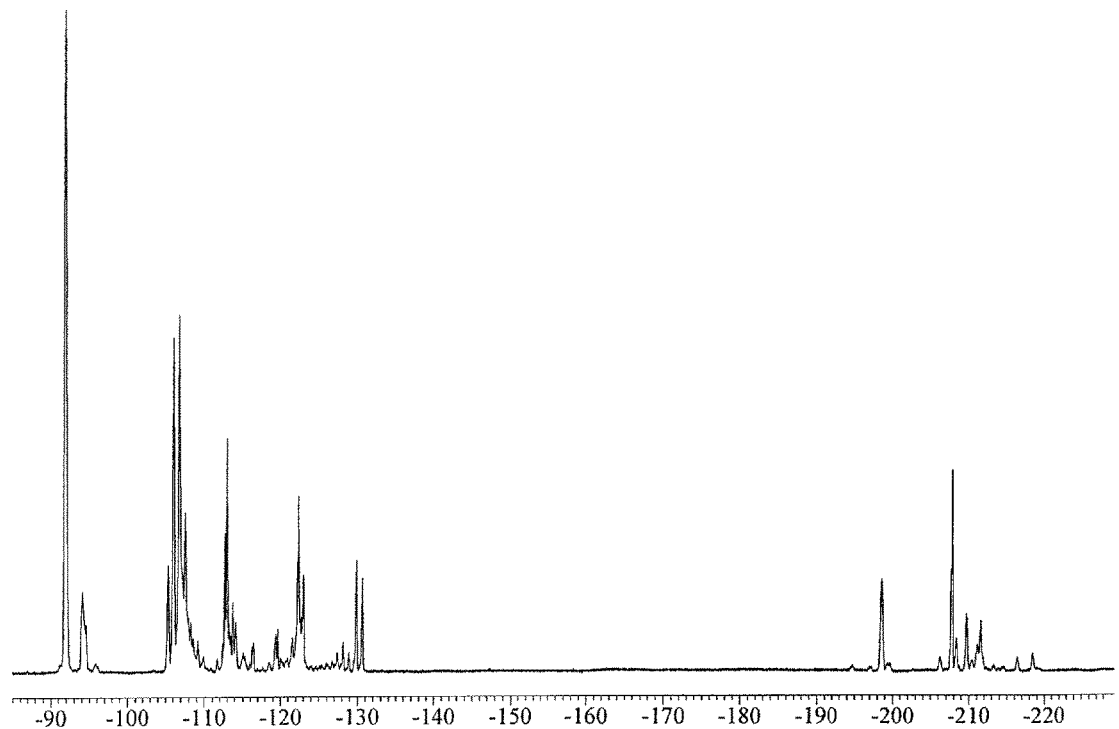
FIG. 3 is a $^{19}$F NMR spectrum (recorded at 20° C. in acetone-$d_6$) that makes it possible to observe the various types of fluorine atoms present in the poly(VDF-ter-TrFE-ter-DMVP) terpolymer prepared according to Example 1.
Figure 4:
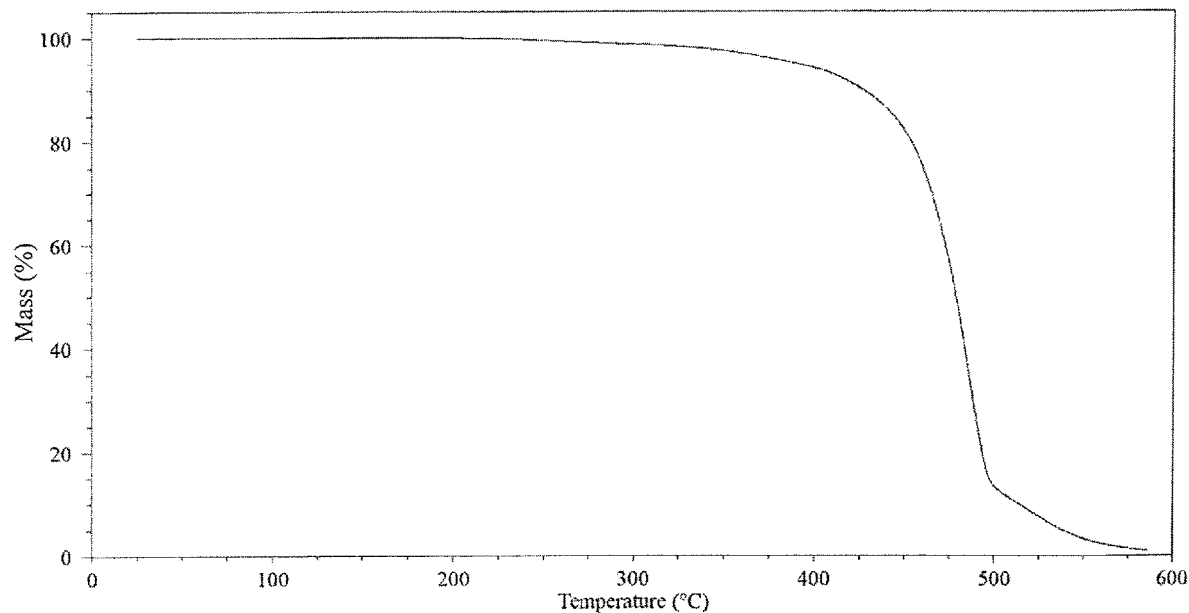
FIG. 4 represents a TGA thermogram, at 10° C./min, in air, of the poly(VDF-ter-TrFE-ter-DMVP) terpolymer prepared according to Example 1.
Figure 6:
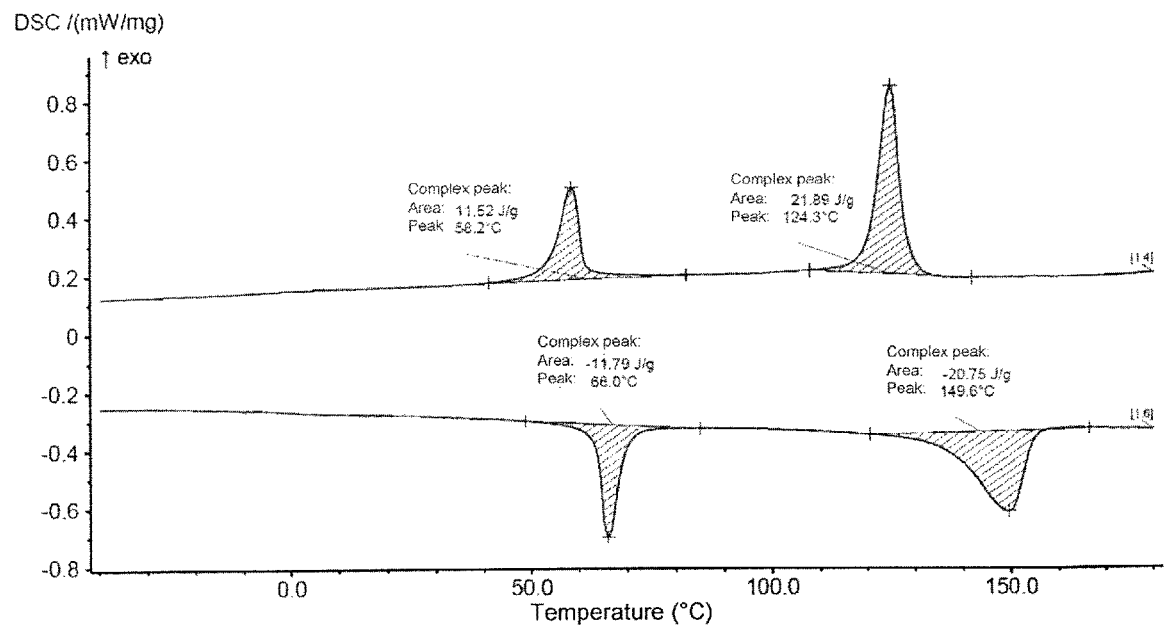
FIG. 6 represents a DSC thermogram of the poly(VDF-ter-TrFE-ter-DMVP) terpolymer prepared according to Example 1.

In order to do this, a 100 ml Hastelloy autoclave is equipped with inlet and outlet valves, a rupture disk, a manometer and a pressure sensor connected to a computer to record the change in pressure as a function of time. The autoclave is pressurized with 30 bar of nitrogen in order to verify the absence of leaks. It then undergoes three vacuum-nitrogen cycles that make it possible to eliminate any trace of oxygen. After inerting the reactor, 60 ml of a degassed solution containing di(tert-butylcyclohexyl) peroxydicarbonate (617 mg, 1.6 mmol) and dimethylvinyl phosphonate (DMVP, 683 mg, 5.0 mmol) in dimethylcarbonate (DMC) were introduced into the reactor. The reactor is then cooled to −80° C. in order to introduce the gaseous monomers. Trifluoroethylene (TrFE, 17.0 g, 207 mmol) then vinylidene fluoride (VDF, 20.0 g, 313 mmol) are transferred into the reactor and the amount of each monomer is measured by double weighing. After having loaded all the reactants, the autoclave is reheated to ambient temperature then heated to 48° C. The reaction lasts 17 hours and a pressure drop of 22 bar is observed relative to the 30 bar at the start of polymerization. After the reaction, the reactor is placed in an ice bath and degassed. The crude, viscous and colourless solution is transferred into a beaker and diluted in 200 ml of acetone. This solution is precipitated from 4 litres of cold pentane. The product obtained, a white solid, is dried at 80° C. under vacuum for 14 hours. The polymer obtained (34.5 g, yield=91%) is characterized by $^1$H (FIG. 2), $^{19}$F (FIG. 3) and $^{31}$P NMR spectroscopy, SEC, TGA (FIG. 4) and DSC (FIG. 6).

Figure 5:
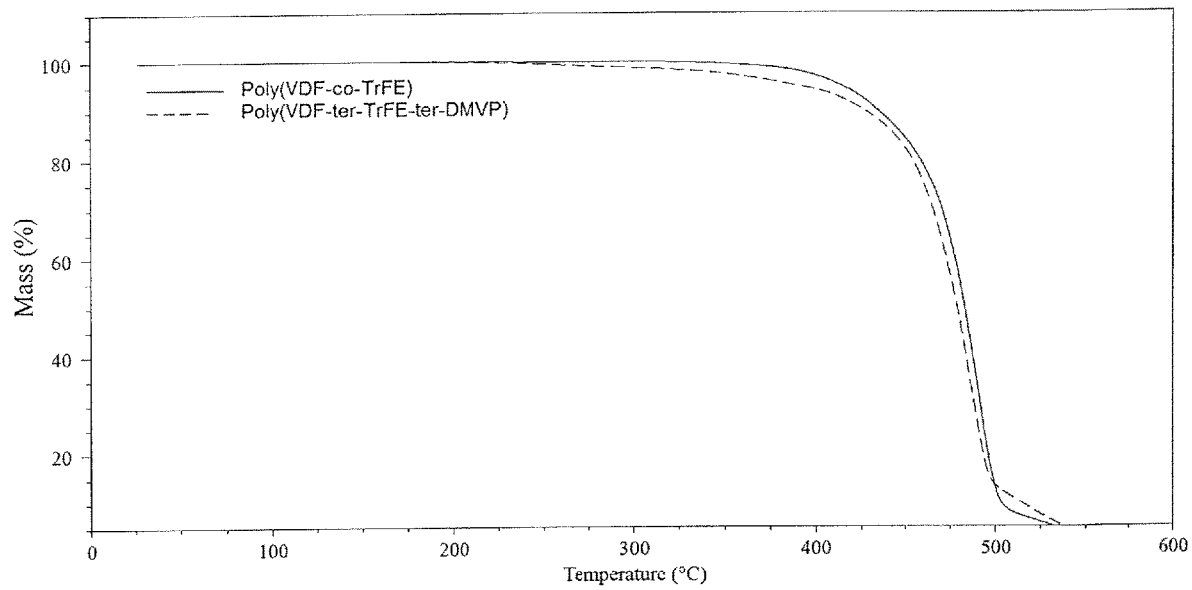
FIG. 5 represents the superimposed TGA thermograms, at 10° C./min, in air, of the poly(VDF-ter-TrFE-ter-DMVP) terpolymer prepared according to Example 1 and of a comparative copolymer with no DMVP moieties.

As illustrated in FIG. 5, the curve obtained by TGA for this terpolymer can be superimposed on the one obtained for the corresponding copolymer, with no moieties derived from the DMVP monomer. It can therefore be concluded therefrom that the introduction of this monomer does not modify the thermal properties of the fluoropolymer which remain stable up to 300° C. with a decomposition temperature corresponding to 5% weight loss which is equal to 390° C.

Figure 7:
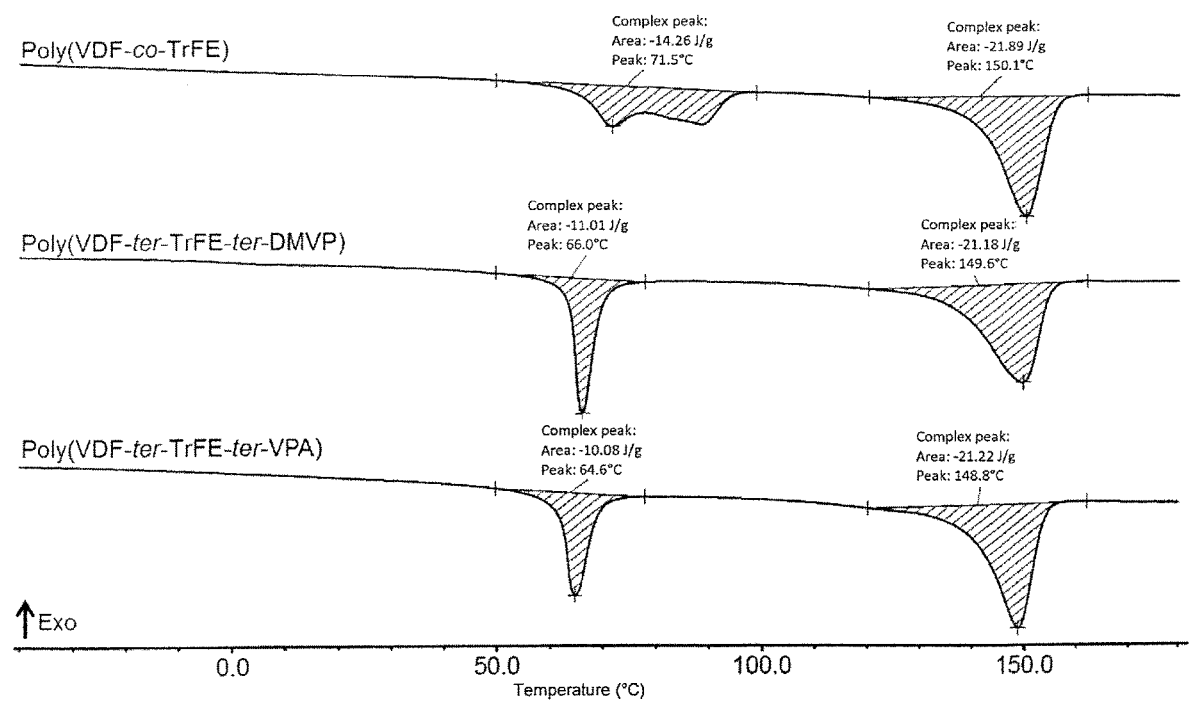
FIG. 7 represents the superimposed DSC thermograms of a poly(VDF-ter-TrFE-ter-VPA) terpolymer prepared according to Example 2 (bottom curve), of a poly(VDF-ter-TrFE-ter-DMVP) terpolymer prepared according to Example 1 (middle curve) and of a comparative copolymer with no DMVP moieties (top curve).

Similarly, as shown in FIG. 7, the DSC curve of the terpolymer from Example 1 is substantially identical to that of the comparative copolymer, with a melting temperature of 150° C. and an enthalpy of fusion of 21 J/g. The semicrystalline structure of the copolymer is not therefore altered by the introduction of the adhesion-promoting monomer. Moreover, the terpolymer has the same electroactivity properties as the comparative copolymer, with a Curie transition temperature of 66° C., characteristic of passing from a ferroelectric phase to a paraelectric phase.

Example 2

Preparation of a poly(VDF-ter-TrFE-ter-VPA) terpolymer

The poly(VDF-ter-TrFE-ter-DMVP) terpolymer obtained according to Example 1 was hydrolysed according to the reaction scheme illustrated in FIG. 1 ($2^{nd}$ step) in order to obtain a poly(VDF-ter-TrFE-ter-VPA) terpolymer in which the phosphonic ester functions are converted into phosphonic acid functions.

In order to do this, a 250 ml three-necked round-bottomed flask, equipped with a 50 ml dropping funnel, a water-cooled condenser and a thermometer, is dried and flushed with nitrogen for 15 minutes. It contains 10.0 g of the terpolymer prepared in Example 1. A low nitrogen pressure in the assembly prevents any ingress of moisture. 60 ml of dry tetrahydrofuran (THF) are introduced via the dropping funnel. The reaction medium is placed in an ice bath and cooled to 4° C. 675 mg of bromotrimethyl silane (TMSBr) are added dropwise over 15 minutes. Next, the reaction medium is gradually reheated to ambient temperature. After 15 hours of reaction, 100 ml of methanol (MeOH) are introduced via the dropping funnel. The solution is vigourously stirred for 2 hours. After the reaction, the solvents are evaporated off using a rotary evaporator. The solid thus obtained is dissolved in acetone and then precipitated twice from 2 litres of cold pentane. The white powder obtained (8.2 g, yield=82%) is dried under vacuum for 14 hours, then characterized by $^1$H (FIG. 2), $^{19}$F and $^{31}$P NMR spectroscopy, TGA and DSC.

Figure 2:
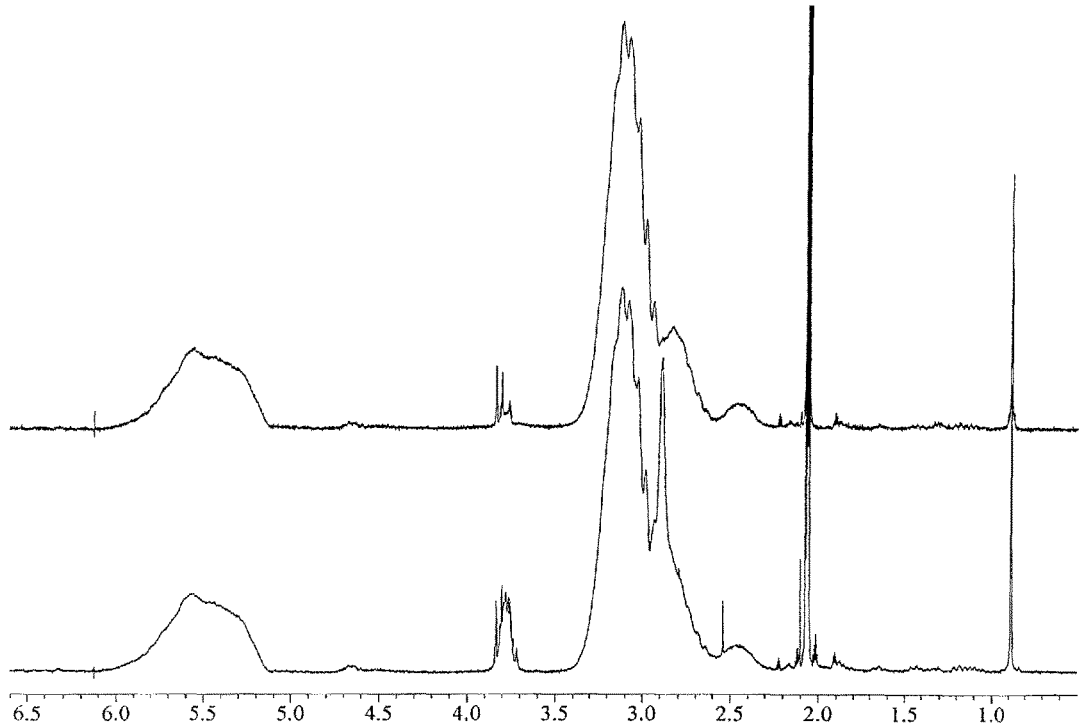
FIG. 2 is a $^1$H NMR spectrum (recorded at 20° C. in acetone-$d_6$) that makes it possible to observe the various types of protons present in the poly(VDF-ter-TrFE-ter-DMVP) terpolymer prepared according to Example 1 (at the bottom) and poly(VDF-ter-TrFE-ter-VPA) terpolymer prepared according to Example 2 (at the top).

In FIG. 2, the comparison of the spectrum obtained for the terpolymer from Example 2 with that of the terpolymer from Example 1 shows a disappearance of the broad unresolved peak between 3.7 and 3.9 ppm, characteristic of the protons of the methyl groups of the DMVP and therefore confirms the complete hydrolysis of the DMVP (vinylphosphonic acid dimethyl ester) units to VPA (vinylphosphonic acid).

Example 3

Radical Terpolymerization of VDF with TrFE and MAF

Figure 8:
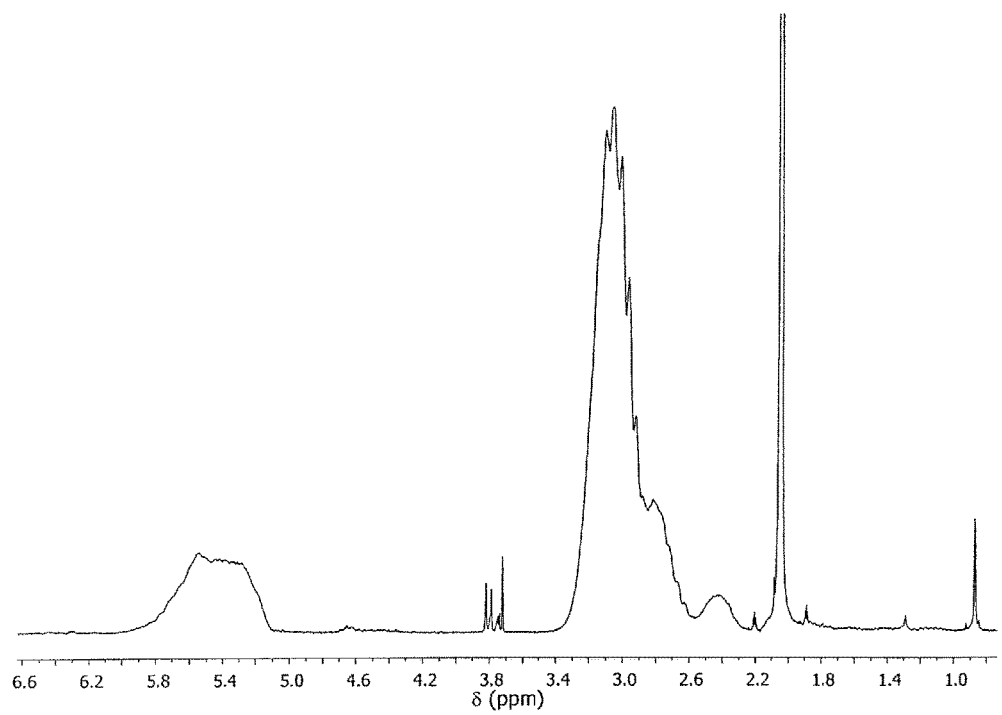
FIG. 8 is a $^1$H NMR spectrum (recorded at 20° C. in acetone-$d_6$) that makes it possible to observe the various types of protons present in the poly(VDF-ter-TrFE-ter-MAF) terpolymer prepared according to Example 3.
Figure 9:
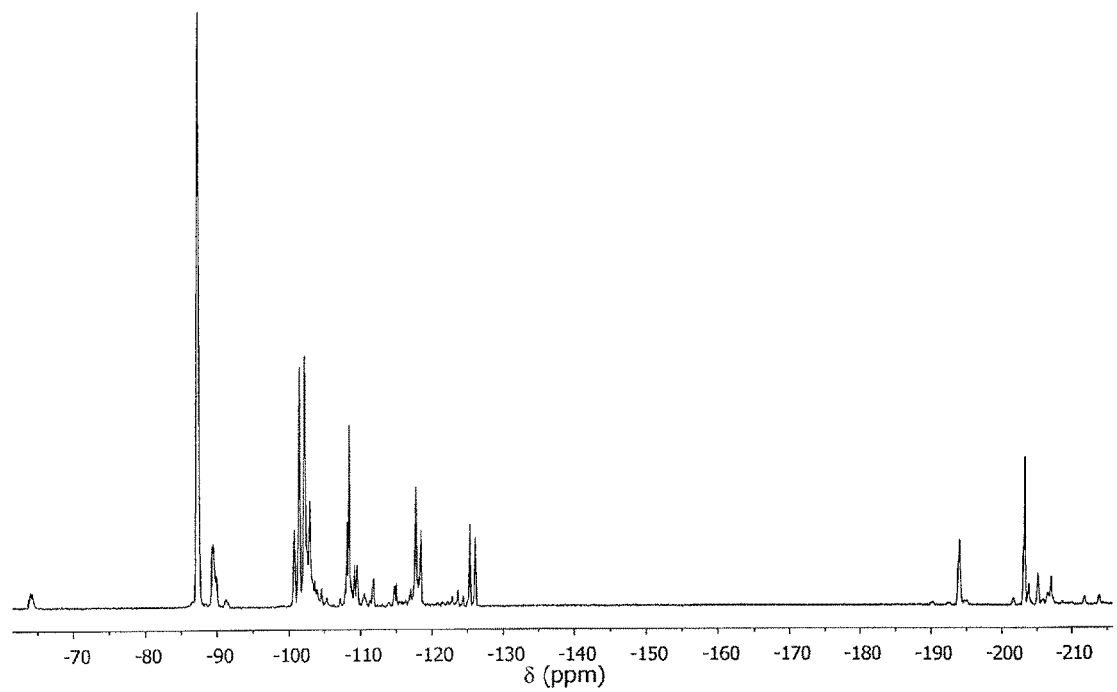
FIG. 9 is a $^{19}$F NMR spectrum (recorded at 20° C. in acetone-$d_6$) that makes it possible to observe the various types of fluorine atoms present in the poly(VDF-ter-TrFE-ter-MAF) terpolymer prepared according to Example 3.

A 100 ml Hastelloy autoclave is equipped with inlet and outlet valves, a rupture disk, a manometer and a pressure sensor connected to a computer to record the change in pressure as a function of time (FIG. 9). The autoclave is pressurized with 30 bar of nitrogen in order to verify the absence of leaks. It then undergoes three vacuum-nitrogen cycles that make it possible to eliminate any trace of oxygen. After inerting the reactor, 60 ml of a degassed solution containing di(tert-butylcyclohexyl) peroxydicarbonate (180 mg) and 2-trifluomethylacrylic acid (MAF, 0.7 g, 5 mmol) in dimethylcarbonate (DMC) were introduced into the reactor. The reactor is then cooled to −80° C. in order to introduce the gaseous monomers. Trifluoroethylene (TrFE, 14.0 g, 169 mmol) then vinylidene fluoride (VDF, 21.0 g, 328 mmol) are transferred into the reactor and the amount of each monomer is measured by double weighing. After having loaded all the reactants, the autoclave is reheated to ambient temperature then heated to 48° C. The reaction lasts 18 hours and a pressure drop of 22 bar is observed relative to the 23 bar at the start of polymerization. After the reaction, the reactor is placed in an ice bath and degassed. The crude, viscous and colourless solution is transferred into a beaker and diluted in 200 ml of acetone. This solution is precipitated from 4 litres of cold water. The product obtained, a white solid, is dried at 80° C. under vacuum for 14 hours. The polymer obtained (30.1 g, yield=84%, VDF/TrFE/MAF molar composition=68/31/1) is characterized by $^1$H (FIG. 8) and $^{19}$F (FIG. 9) NMR spectroscopy, TGA and DSC.

In FIG. 8, the signal of the protons of the MAF units is within the broad unresolved peak characteristic of the protons of the VDF units, i.e. between 2.2 and 3.4 ppm. The broad unresolved peak between 5.1 and 6.0 ppm is characteristic of the protons of the TrFE units. In FIG. 9, the signals between −63 and −71 ppm are characteristic of the $CF_3$ groups of the MAF units. The signals between −90 and −135 ppm are characteristic of the $CF_2$ groups of the TrFE and VDF units. The signals between −193 and −221 ppm are characteristic of the CFH groups of the TrFE units. The combination of FIGS. 8 and 9 makes it possible to calculate the composition of the terpolymer obtained.

Example 4

Radical Terpolymerization of VDF with TrFE and MAF

The synthesis, in aqueous suspension, of a poly(VDF-ter-TrFE-ter-MAF) terpolymer was carried out in a 3 litre reactor. VDF (790 g, 12.3 mol) and TrFE (434 g, 5.29 mol) were transferred into the reactor preloaded with 1500 g of water and a hydroxypropylmethyl cellulose stabilizer. The reactor is heated to 48° C. then the radical initiator is introduced. The pressure of the reactor is maintained between 80 and 100 bar by injecting deionized water. MAF (25 g, 0.179 mol) is diluted in 60 ml of deionized water. A third of this solution is injected: (i) at the start of the polymerization, (ii) after conversion of one third and (iii) of two thirds of the (VDF+TrFE) amount initially introduced. At the end of the reaction, the crude product is filtered and the fine white powder obtained is washed several times in deionized hot water (50° C.). The final product is dried for 24 hours at 60° C. in a ventilated oven.

The polymer obtained is characterized by $^1$H and $^{19}$F (FIG. 11) NMR spectroscopy, TGA and DSC.

Figure 11:
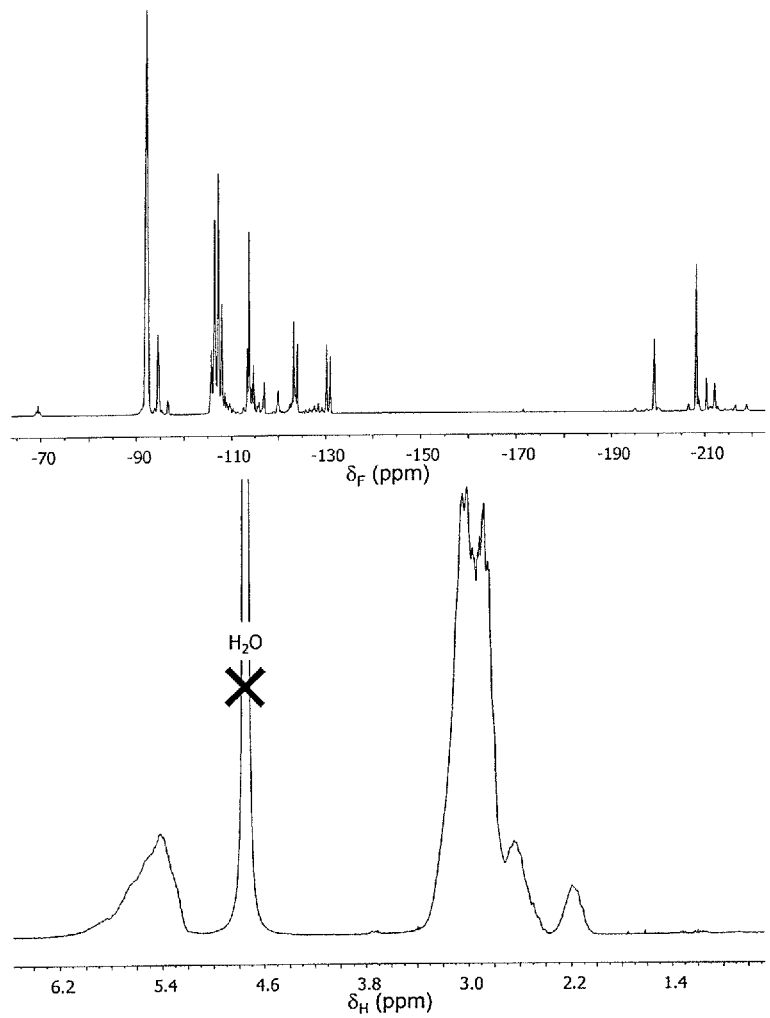
FIG. 11 is a $^{19}$F NMR spectrum (top) and $^1$HNMR spectrum (bottom), in $C_5D_5N$, of the poly(VDF-ter-TrFE-ter-MAF) terpolymer from Example 4.

In FIG. 11, the signal of the protons of the MAF units is within the broad unresolved peak characteristic of the protons of the VDF units, i.e. between 2.2 and 3.4 ppm. The broad unresolved peak between 5.1 and 6.0 ppm is characteristic of the protons of the TrFE units. The signals observed by $^{19}$F NMR between −63 and −71 ppm are characteristic of the CF$_3$ groups of the MAF units. The signals between −90 and −135 ppm are characteristic of the CF$_2$ groups of the TrFE and VDF units. The signals between −193 and −221 ppm are characteristic of the CFH groups of the TrFE units. The combination of the spectra presented in FIG. 11 makes it possible to calculate the composition of the terpolymer obtained.

Table 1 below summarizes the conditions of the radical terpolymerizations of VDF with TrFE and DMVP or MAF and the properties of the polymers obtained according to Examples 1 to 4.

TABLE 1

| Ex. | | Composition (% mol) | | | Yld (%) | $M_n$ (NMR) (kg·mol$^{-1}$) | $T_{d5\%}$ (°C.) | $T_c$ (°C.) | $T_m$ (°C.) | $\Delta H_f$ (J/g) |
|---|---|---|---|---|---|---|---|---|---|---|
| | | VDF | TrFE | APM | | | | | | |
| Comp. | Monomers | 63 | 37 | — | 78 | 31 | 413 | 72 | 150 | 21 |
| | Polymer | 65 | 35 | — | | | | | | |
| 1 | Monomers | 60 | 39 | 1 | 91 | 20 | 390 | 66 | 150 | 21 |
| | Polymer | 60.3 | 38.7 | 1 | | | | | | |
| 2 | Monomers | — | — | — | 82 | 20 | 364 | 65 | 149 | 20 |
| | Polymer | 63 | 36 | 1 | | | | | | |
| 3 | Monomers | 65 | 34 | 1 | 84 | 67 | 405 | 76 | 147 | 22 |
| | Polymer | 67.6 | 31.5 | 0.9 | | | | | | |
| 4 | Monomers | 69 | 30 | 1 | 76 | 115 | 428 | 99 | 150 | 23 |
| | Polymer | 69.2 | 30.3 | 0.5 | | | | | | |

In this table, "monomers" indicates the percentage of each of the monomers relative to the initial mixture of monomers and "polymer" indicates the weight percentage of units resulting from these monomers in the polymer, measured by $^{19}$F NMR spectroscopy. In addition, "APM" denotes the adhesion-promoting monomer used (DMVP in Example 1, VPA in Example 2, MAF in Examples 3 and 4).

Yld denotes the yield of the reaction.

Mn represents the number-average molecular mass of the polymer.

$T_{d5\%}$ denotes the decomposition temperature of the polymer resulting in 5% weight loss.

$T_C$ represents the Curie temperature as determined by differential scanning calorimetry (DSC) at the maximum of the endotherm during the second temperature rise at 20° C./min.

$T_m$ represents the melting temperature of the terpolymer, as determined by differential scanning calorimetry (DSC) at the maximum of the endotherm during the second temperature rise.

$\Delta H_f$ represents the enthalpy of fusion measured by differential scanning calorimetry (DSC) during the second temperature rise.

As it emerges from this table, the semicrystalline and electroactive nature of the fluoropolymer, and also the thermal stability thereof, are not substantially altered by the introduction of the MAF groups, like that which was observed for the DMVP and VPA groups.

Example 5

Preparation of Films and Adhesion Tests

In order to characterize the improvement in the adhesion properties, thin films were prepared on aluminium substrates. In order to do this, 1.00 g of the poly(VDF-ter-TrFE-ter-DMVP) terpolymer (Example 1) and 1.00 g of the poly(VDF-ter-TrFE-ter-VPA) terpolymer (Example 2) are dissolved separately in 5.00 g of methyl ethyl ketone (MEK) at ambient temperature. The viscous solutions are deposited on the substrates and the solvent is evaporated at ambient temperature over 8 h. The films thus obtained are dried for 14 h at 80° C. under vacuum then postcured at 110° C. for 4 h.

A comparative film is prepared under the same conditions, from a poly(VDF-co-TrFE) copolymer.

Figure 10:
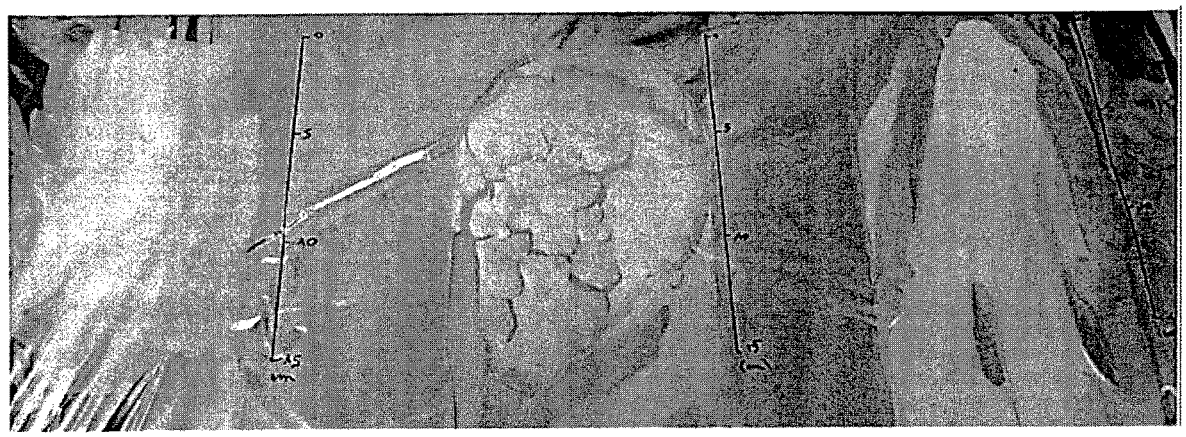
FIG. 10 illustrates the appearance of films prepared with a poly(VDF-co-TrFE) copolymer (on the left), a poly(VDF-ter-TrFE-ter-DMVP) terpolymer (in the centre) and a poly(VDF-ter-TrFE-ter-VPA) terpolymer (on the right), respectively, once applied to aluminium foil.

It is observed that the film prepared from the comparative copolymer (FIG. 10, left) detaches from the aluminium foil without cracking. The film obtained using the terpolymer from Example 1 (FIG. 10, centre) does not adhere to the aluminium substrate; it detaches and cracks due to the shrinkage thereof during drying. On the contrary, the film prepared from the terpolymer from Example 2 (FIG. 10, right) adheres perfectly to the aluminium foil even when the latter is deliberately deformed (folded, rolled, etc.). The film obtained from this terpolymer therefore has good adhesion properties.

A film was prepared in a similar manner from the copolymer from Example 4. It adhesion properties were evaluated according to the standard ASTM D3359, by comparison with the control film based on the poly(VDF-co-TrFE) copolymer. The copolymer according to the invention had good properties of adhesion to glass, classified as level 5 on the scale of the ASTM standard (which ranges from 0 to 5). Similar results were observed on metal substrates such as gold and aluminium.

The invention claimed is:

1. A composite part comprising a solid polymer film in direct contact with at least one metal, polymer, or glassy element, wherein said film is a copolymer obtained by:
   (a) radical copolymerization of monomers comprising: (i) vinylidene fluoride (VDF), (ii) trifluoroethylene (TrFE), (iii) optionally at least one other fluoromonomer and (iv) an adhesion-promoting monomer, said adhesion-promoting monomer being selected from the group consisting of a vinylphosphonic acid dialkyl ester, vinylphosphonic acid and (2-trifluoromethyl) acrylic acid, and wherein the molar proportion of the moieties derived from said adhesion-promoting monomer is less than 1% of the copolymer, and
   (b) when they are present, conversion of the ester function into a weak acid function.

2. The composite part of claim 1, in the form of an electroactive device, selected from: an actuator: a sensor: an artificial muscle; a membrane; a capacitor; a binder for lithium-ion batteries; a fuel cell; and a component of another device for producing energy.

3. An electroactive device comprising a composite part, said electroactive device being selected from: an actuator: a sensor: an artificial muscle; a membrane; a capacitor; a binder for lithium-ion batteries; a fuel cell; and a component of another device for producing energy and said composite part comprising a solid polymer film in direct contact with at least one metal, polymer, or glassy element, wherein said film is a copolymer obtained by radical copolymerization of monomers comprising: (i) vinylidene fluoride (VDF), (ii) trifluoroethylene (TrFE), (iii) optionally at least one other fluoromonomer and (iv) an adhesion-promoting monomer, said adhesion-promoting monomer being a non-perfluorinated vinyl or vinylene monomer bearing at least one weak acid or weak acid precursor function other than carboxyvinyl, carboxyvinylene, 1-alkylcarboxyvinyl and 1-alkylcarboxyvinylene monomers and precursors thereof, wherein the vinyl or vinylene monomer further bears an electron-withdrawing group when the weak acid function is a carboxylic acid function, and wherein the molar proportion of the moieties derived from said adhesion-promoting monomer is less than 1% of the copolymer, and, when they are present, conversion of the weak acid precursor functions into weak acid functions.

* * * * *